United States Patent
Lynch et al.

(10) Patent No.: US 9,991,777 B2
(45) Date of Patent: Jun. 5, 2018

(54) METHOD AND CIRCUITRY FOR GENERATING PULSE WIDTH MODULATED SIGNALS

(71) Applicant: Texas Instruments Incorporated, Dallas, TX (US)

(72) Inventors: Brian Thomas Lynch, Brookline, NH (US); Stefan Wlodzimierz Wiktor, Raleigh, NC (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 13 days.

(21) Appl. No.: 15/215,395

(22) Filed: Jul. 20, 2016

(65) Prior Publication Data

US 2018/0026535 A1  Jan. 25, 2018

(51) Int. Cl.
*H02M 1/08* (2006.01)
*H02M 1/44* (2007.01)

(52) U.S. Cl.
CPC .............. *H02M 1/08* (2013.01); *H02M 1/44* (2013.01)

(58) Field of Classification Search
CPC .. H02M 1/08; H02M 1/44; H02M 2001/0003; H02M 2001/0025; H02M 3/156; H02M 3/157
See application file for complete search history.

(56) References Cited

U.S. PATENT DOCUMENTS

| | | | | |
|---|---|---|---|---|
| 8,000,071 B2* | 8/2011 | Huang | .................... | H02M 1/32 361/84 |
| 8,773,099 B2* | 7/2014 | Granger | .............. | H02M 3/1588 323/284 |
| 8,988,056 B2* | 3/2015 | Smith, Jr. | ........... | H02M 3/1588 323/282 |
| 9,099,925 B2* | 8/2015 | Sugawara | ........... | H02M 1/4225 |
| 9,306,548 B1* | 4/2016 | Wiktor | ..................... | H03K 7/08 |
| 2017/0099004 A1* | 4/2017 | Nishijima | ............... | H02M 1/08 |

* cited by examiner

*Primary Examiner* — Kyle J Moody
(74) *Attorney, Agent, or Firm* — Tuenlap D. Chan; Charles A. Brill; Frank D. Cimino

(57) ABSTRACT

A method of generating pulse width modulated (PWM) signals includes receiving a coarse signal correlated to the widths of pulses to be generated in the PWM signal. Trigger signals are generated and a one-shot device is triggered in response to the trigger signals. The one-shot device generates pulses having widths correlated to the coarse signal. A control signal correlated to the widths of the pulse to be generated in the PWM signal is received and the widths of the pulses generated by the one-shot device are adjusted in response to the control signal.

19 Claims, 4 Drawing Sheets

METHOD AND CIRCUITRY FOR GENERATING PULSE WIDTH MODULATED SIGNALS

BACKGROUND

Most DC-to-DC converters use switching circuitry based on pulse width modulation (PWM) to convert an input DC voltage to an output DC voltage. The ratio of the pulse widths of the PWM signal to the period of the PWM signal is proportional to the DC output voltage. The trend in DC-to-DC power conversion is towards very high switching frequencies in the converters, which requires very low periods in the PWM signals. Some applications, including converters, require that the switching operate with a fixed PWM frequency.

Conventional analog controlled PWM generators rely on saw-tooth signals to generate the PWM signals. The saw-tooth signals are compared to a reference voltage, wherein the resulting signal is a PWM signal having pulse widths that are proportional to the reference voltage. These conventional PWM generators are limited in their ability to generate narrow pulses in a jitter-free fashion. System noise and parasitic elements impact the ability of a PWM generator to develop narrow pulses suitable for power conversion at high conversion frequencies.

SUMMARY

A method of generating pulse width modulated (PWM) signals includes receiving a coarse signal correlated to the widths of pulses to be generated in the PWM signal. Trigger signals are generated and a one-shot device is triggered in response to the trigger signals. The one-shot device generates pulses having widths correlated to the coarse signal. A control signal correlated to the widths of the pulse to be generated in the PWM signal is received and the widths of the pulses generated by the one-shot device are adjusted in response to the control signal.

DETAILED DESCRIPTION

Most DC-to-DC converters use switching circuitry based on pulse width modulation (PWM) signals to convert an input DC voltage to an output DC voltage. The PWM signals switch transistors within the converters to generate output voltages that are proportional to the ratio of the pulse widths of the PWM signals to the period of the PWM signals. Examples of such DC-to-DC converters are buck and boost converters. The trend in DC-to-DC power conversion is towards very high switching frequencies on the switching transistors with some applications operating optimally with a fixed switching frequency. PWM signals generated by PWM generators and methods described herein are capable of generating very narrow pulse widths, which enables very high switching frequencies. The PWM generators and methods described herein have applications in DC-to-DC converters and other applications where PWM signals are required.

Figure 1:
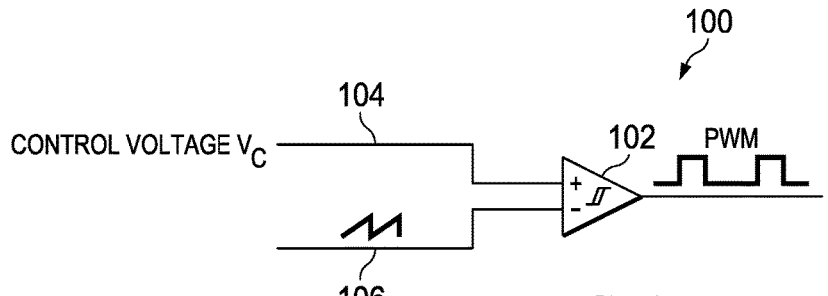
FIG. 1 is a schematic diagram of a conventional PWM generator.
Figure 2:
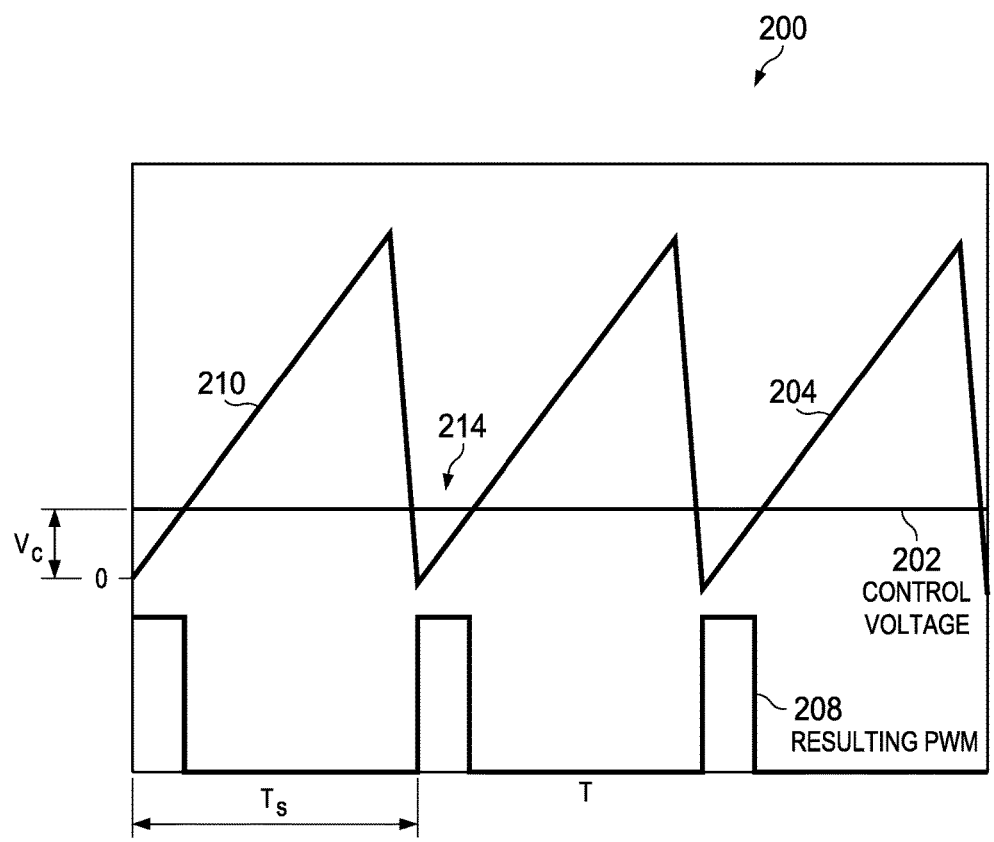
FIG. 2 is a graph showing the generation of PWM signals using the PWM generator of FIG. 1.

FIG. 1 is a schematic diagram of a conventional PWM generator 100 and FIG. 2 is a graph 200 showing the generation of PWM signals using the PWM generator 100 of FIG. 1. The PWM generator 100 includes a comparator 102 with a first input 104 coupled to a control voltage $V_C$ and a second input 106 coupled to a source that generates a saw-tooth waveform. FIG. 2 provides examples of the control voltage waveform 202 and the saw-tooth waveform 204. The comparator 102 generates a high voltage when the value of the saw-tooth waveform 204 is less than the control voltage waveform 202. The comparator 102 generates a low voltage when the value of the saw-tooth waveform 204 is greater than the control voltage waveform 202. The result of the signal generated by the comparator 102 is the PWM signal 208 of FIG. 2. The PWM signal 208 is referred to as a fixed-frequency PWM signal because the frequency of the saw-tooth waveform 204 and the resulting PWM signal 208 is constant or fixed.

Conventional analog-controlled, saw-tooth based, fixed-frequency PWM generators, such as the PWM generator 100, are limited in their ability to generate narrow PWM pulses in a jitter-free fashion. For example, conventional PWM generators typically cannot generate pulses less than 30 ns without jitter. Several factors, such as system noise and integrated circuit parasitic elements, impact the ability of a conventional PWM generator to generate clean, narrow pulses suitable for power conversion at high conversion frequencies.

The gain of a conventional analog PWM generator is proportional to the change in duty cycle divided by the change in the control voltage $V_C$ and is determined by the comparison of the slope of the saw-tooth ramp and the control voltage $V_C$. The ramp 210 of the saw-tooth waveform 204 is shown in FIG. 2. Increasing the gain of the PWM generator 100 to a higher level necessitates the need to decrease the amplitude of the saw-tooth waveform 204 to provide a shallower slope in the ramp 210 of the saw-tooth waveform 204. As the amplitude of the saw-tooth waveform 204 decreases, the signal-to-noise ratio of the PWM generator 100 decreases, which results in pulse width jitter or open loop system instability.

Referring to FIG. 2, the slope near the valley 214 of the saw-tooth waveform 204 may contain nonlinearities resulting in gain irregularities or jitter at narrow pulse widths. One solution to this problem is to offset the control voltage $V_C$ and "blank" a portion of the pulse. While this does help reduce the nonlinearity problem, the disadvantage is a limitation of dynamic range of pulse widths due to the blanking.

Figure 3:
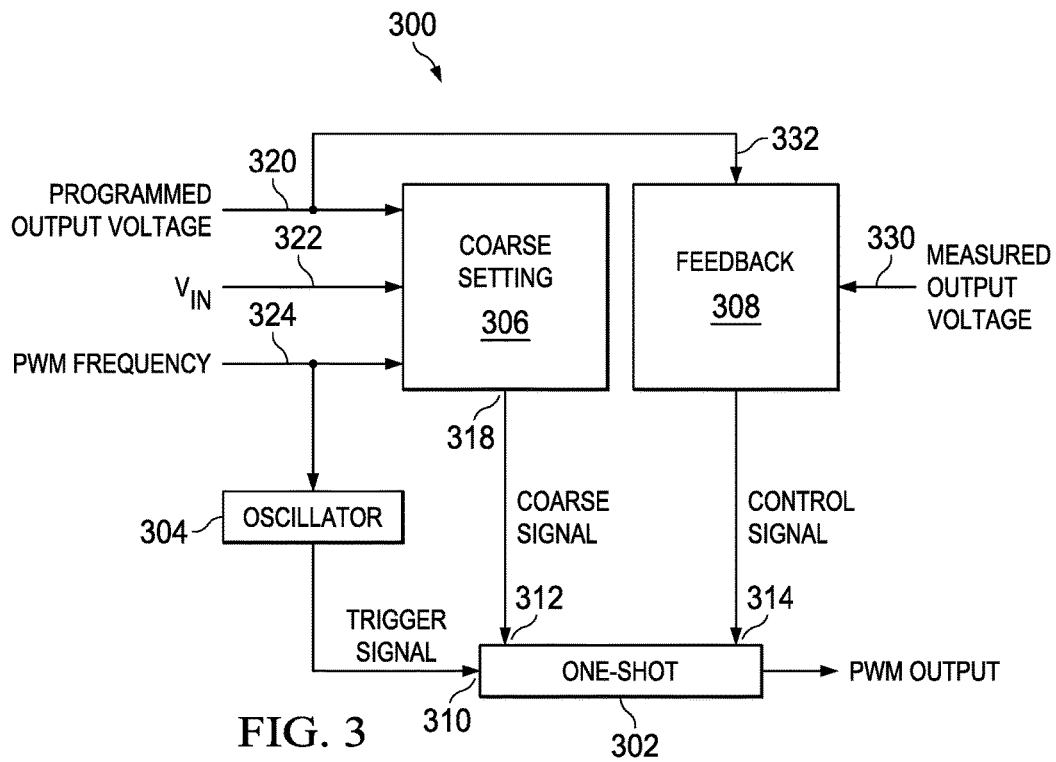
FIG. 3 is a block diagram of a PWM generator based on a one-shot device.

The circuits and methods described herein overcome the above-described problems with PWM generators by generating PWM signals using a one-shot device. FIG. 3 is a block diagram of a PWM generator 300 based on a one-shot device 302. The PWM generator 300 includes the one-shot device 302, an oscillator 304, coarse signal circuitry 306, and a feedback circuit 308. The elements of the PWM generator 300 are shown as individual components; however, they may be integrated into a single device.

The one-shot device 302 has a first input 310 that receives a trigger signal generated by the oscillator 304. The trigger signal may be a series of clock pulses operating at a fixed frequency or the pulses may vary in frequency. A second input 312 receives a coarse setting generated by the circuitry 306 that provides a coarse setting as to the pulse widths generated by the one-shot device 302. The pulse widths described herein relate to the ratio of a pulse width to the period of the PWM signal. As such, a long pulse width typically refers to a long pulse width relative to the period of the PWM signal. A third input 314 receives a fine tuning control signal generated by the feedback circuit 308 that fine tunes the pulse widths. In some examples, such as when the PWM generator 300 is used in a power supply or voltage converter, the control signal may be an error signal indicative of the error between a measured output voltage and a programmed output voltage.

The feedback circuit 308 generates the control signal for adjusting the widths of the pulses generated by the one-shot device 302. More specifically, the control signal provides fine tuning for the widths of the pulses generated by the one-shot device 302. In some examples, such as when the PWM generator 300 is incorporated within a voltage converter, the control signal is proportional to the difference between a programmed output voltage and a measured output voltage. The control signal provides feedback so that the PMW generator 300, or devices coupled to the PWM generator, match the measured output voltage with the programmed output voltage by fine tuning the pulse widths generated by the one-shot device 302.

The course signal circuitry 306 sets a coarse setting for the widths of the pulses generated by the one-shot device 302. In some examples, the coarse setting is an initial pulse width setting for the one-shot device 302. The circuitry 306 has an output 318 that outputs a signal to the one-shot device 302 indicating the coarse width of the pulses generated by the one-shot device 302. The example circuitry 306 has three inputs for receiving signals that are decoded by the circuitry 306 to generate the coarse signal. A first input 320 receives a signal indicative of the programmed output voltage. In some examples, the programmed output voltage is the voltage that a voltage converter associated with the PWM generator 300 is programmed to output. In examples where the PWM generator 300 is used in other applications, the input 320 is indicative of a programmed output signal. A second input 322 receives a signal indicative of the input voltage to the voltage converter. In examples where the PWM generator 300 is used in other applications, the input 322 may be an input signal other than an input voltage. A third input 324 receives a signal indicative of the frequency at which the one-shot device 302 generates the pulses.

The oscillator 304 generates the trigger signals for the one-shot device 302, which generates the PWM signal in response to the trigger signals. In some examples, the oscillator 304 is a voltage-controlled oscillator or current-controlled oscillator that receives the above-described signal, such as a voltage or current. The signal is indicative of the frequency at which the one-shot device 302 generates the pulses. The oscillator 304 converts the received signal to a frequency at which the trigger signals are generated.

In operation, the PWM generator 300 receives a signal indicative of a desired output. In the example of FIG. 3, the desired output is the programmed output voltage. In addition, the PWM generator 300 receives a signal indicative of an input and a signal indicative of the frequency at which the PWM generator 300 generates pulses. In the example of FIG. 3, the input signal is the input voltage to a voltage converter. The oscillator 304 receives the frequency input and generates trigger signals that are output to the one-shot device 302.

The circuitry 306 receives the input signals and determines a coarse or initial pulse width and generates a coarse signal indicative of this pulse width. In the example of FIG. 3, the circuitry 306 receives signals indicative of the programmed output voltage, the input voltage, and the frequency of the PWM signals. In some examples, the circuitry 306 determines pulse widths that are proportional or equal to the period of the PWM signals multiplied by the ratio of the programmed output voltage to the input voltage. This pulse width information is transmitted to the one-shot device 302 as the coarse signal, so that the one-shot device 302 can generate the appropriate pulse widths in the PWM signals.

The one-shot device 302 generates the PWM signals having pulse widths set by the circuitry 306 and the feedback circuit 308. In the example of the PWM generator 300 operating a voltage converter, the output voltage is the above-described measured output voltage and is received by the feedback circuit 308 by way of an input 330. The feedback circuitry 308 compares the measured output voltage to the programmed output voltage received at an input 332 and generates the control signal, which may be similar to an error signal. The control signal is received by the one-shot device 302 at the input 314. The one-shot device 302 changes the pulse widths of the PWM signal in response to the control signal to minimize error indicative in the control signal. Minimizing the error indicative in the control signal means changing pulse widths so that the error signal is indicative of minimal difference between the programmed output voltage and the measured output voltage.

Figure 4:
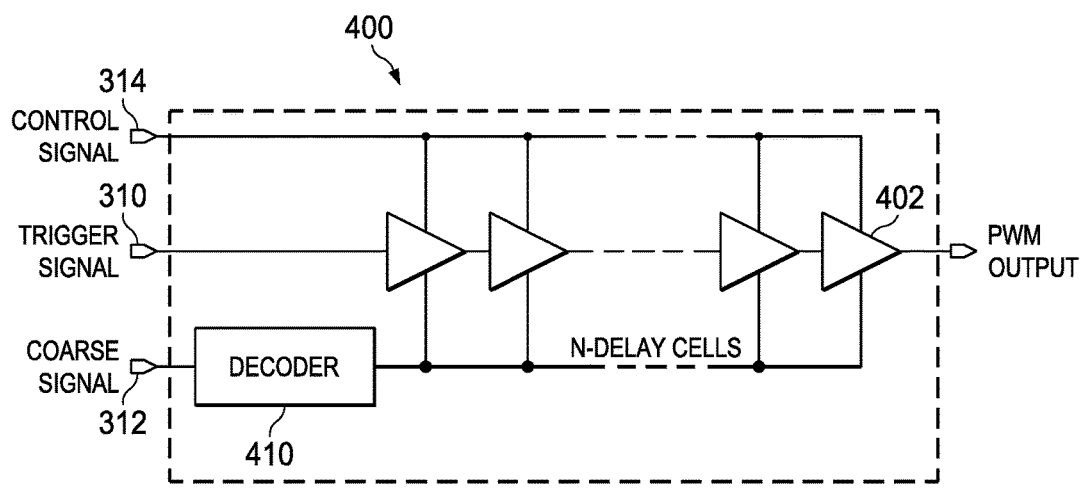
FIG. 4 is a block diagram of a delay portion of the one-shot device of FIG. 3.

FIG. 4 is a block diagram of a delay portion 400 of the one-shot device 302 of FIG. 3. The delay portion 400 includes a plurality of cascaded delay cells 402 that are selectively activated and deactivated as described below. The number of delay cells 402 that are active correlates to the initial width or coarse width of pulses generated by the one-shot device 302. In one example, the delay portion 400 has 256 delay cells 402, wherein each delay cell has a nominal delay of 1.2 nanoseconds. It follows that the coarse range setting for the delay portion is 1.2 nanoseconds to 307.2 nanoseconds, which yields an initial pulse width of 1.2 nanoseconds to 307.2 nanoseconds. The control signal adjusts or fine tunes the delay generated by each of the delay cells 402. In some examples, the control signal provides for 50% to 100% adjustment relative to the course setting, which in the example described above is 0.6 nanoseconds to 1.2 nanoseconds per delay cell.

In the example of FIG. 4, the coarse setting is processed to a digital signal by a decoder 410. The decoder 410 may include many different components, such as de-multiplexors and computers executing code, to convert a binary number into one selection bit for each of the delay cells 402. The number of delay cells 402 correlates to a binary number generated by the decoder 410. With regard to the example of 256 delay cells 402, the decoder 410 generates a 256-bit binary number, wherein each bit of the binary number controls an individual delay cell. The greater the digital number generated by the decoder 410, the more bits the decoder 410 turn on, which turns on more of the delay cells 402. In turn, the number of delay cells 402 that are turned on is directly proportional to the width of the pulses generated by the one-shot device 302, FIG. 3.

Figure 5:
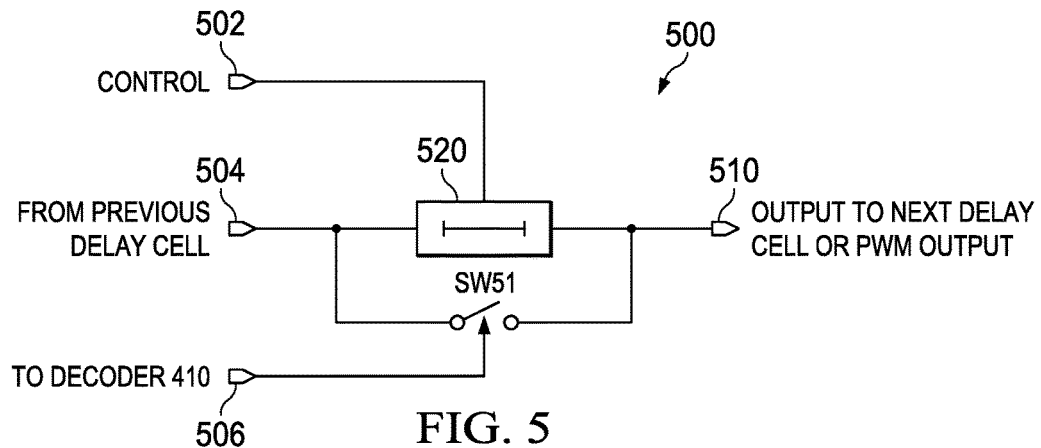
FIG. 5 is a block diagram of an example delay cell in the delay portion of the one-shot device of FIG. 4.

FIG. 5 is a block diagram of an example delay cell 500, which is an example of one of the delay cells 402 of FIG. 4. The delay cell 500 includes an input 502 that receives the control signal described above. An input 504 is coupled to the output of a previous delay cell. If the delay cell 500 is the first in the line of the plurality of delay cells 402, FIG. 4, then the input 504 is coupled to the trigger input 310, FIG. 4, which is coupled to the output of the oscillator 304, FIG. 3. An input 506 is coupled to the decoder 410, FIG. 4, and serves to select or activate the delay cell 500. An output 510 is coupled to a subsequent delay cell. If the delay cell 500 is the last in the line of the delay cells 402, then the output is the PWM signal generated by the one-shot device 302, FIG. 3.

The delay cell 500 includes an adjustable delay device 520 that is coupled to the input 504. The amount of delay generated by the delay device 520 is set by the control signal received at the input 502. A switch SW51 bypasses or shunts the delay device 520 when the switch SW51 is closed. The switch SW51 is controlled by the signal generated by the decoder 410, FIG. 4, which is received at the input 506. The circuitry 306, FIG. 3, generates the coarse signal for input to the one-shot device 302. In the example wherein the PWM generator 300 is used in conjunction with a DC-to-DC converter, the circuitry 306 may have multiplier/divider circuits that generate a coarse signal correlating to the pulse width of the PWM signal being equal to or proportional to the period of the PWM signal multiplied by the ratio of the programmed output voltage to the input voltage. This coarse signal is processed by the decoder 410 of FIG. 4 to determine the number of delay cells 402 that are to be active. If the delay cell 500 is to be active, switch SW51 is open and if the delay cell 500 is to be inactive, switch SW51 is closed, which causes the signal on the input 504 to bypass the delay cell 500.

Figure 6:
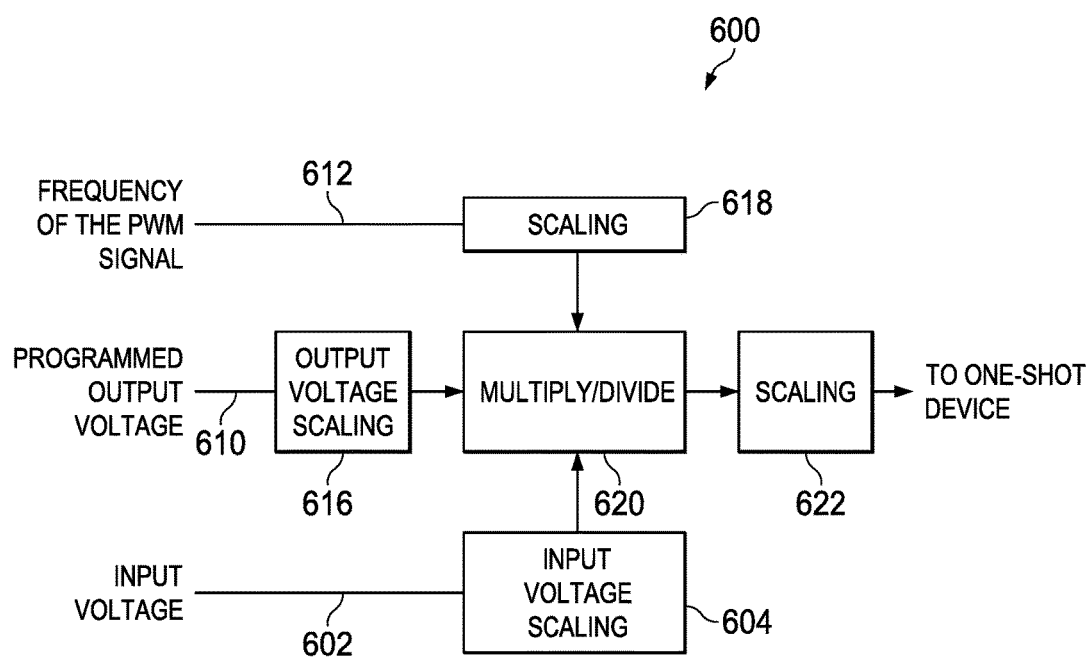
FIG. 6 is a block diagram of example circuitry that generates the coarse signal of FIG. 3.

FIG. 6 is a block diagram of example circuitry 600 that generates the coarse signal within the circuitry 306, FIG. 3. The circuitry 600 includes an input 602 that is coupled to an input signal. In the example of the circuitry 600 used in conjunction with a DC-to-DC converter, the input signal is the input voltage to the DC-to-DC converter. The input 602 is coupled to an input voltage scaling unit 604 that scales the input voltage to a voltage that is compatible with the operating voltages of the circuitry 600. The circuitry 600 also includes an input 610 that is coupled to an input signal. In the example of the circuitry 600 used in conjunction with a DC-to-DC converter, the input 610 is a signal that is proportional to the programmed output voltage of the DC-to-DC converter. The input 610 is coupled to an output voltage scaling unit 616 that scales the input voltage to a voltage that is compatible with the operating voltages of the circuitry 600. The circuitry 600 includes an input 612 that is coupled to an input signal. In the example of the circuitry 600 used in conjunction with a DC-to-DC converter, the input 612 is coupled to a signal that is proportional to the switching period or frequency of the PWM signal. The input 612 is coupled to an input voltage scaling unit 618 that scales the input voltage to a voltage that is compatible with the operating voltages of the circuitry 600.

A multiply/divide circuit 620 performs the functions on the input signals necessary to generate the output signal. In the example described above, the multiply/divide circuit 620 multiplies the period signal at the input 612 by the ratio of the programmed output voltage at the input 610 and the input voltage at the input 602. The output of the multiply/divide circuit 620 is transmitted to scaling circuitry 622, where it is scaled appropriately. The signal is then transmitted to the one-shot device 302, FIG. 3, as the coarse signal 312.

The operation of the PWM generator 300 will be explained with reference to FIGS. 3-6 and operating in conjunction with a DC-to-DC converter. The PWM generator 300 receives four input signals, the programmed output voltage, the input voltage, the measured output voltage, and the PWM frequency signal. The programmed output voltage, the input voltage, and the PWM frequency signal are received in the circuitry 600, which generates the coarse signal as described above. For example, the multiply/divide circuit 620 processes the signals to generate the coarse signal. The oscillator 304 receives the PWM frequency signal and generates clock signals or triggers at the PWM frequency in response to the PWM frequency signal. The feedback circuitry 308 receives the programmed output voltage and the measured output voltage and generates the control signal, which is proportional to the difference between the programmed output voltage and the measured output voltage.

The one-shot device 302 receives the trigger signal from the oscillator 304, the coarse signal from the circuitry 306, and the control signal from the feedback circuitry 308. The coarse signal is received at the input 312 where the decoder 410 converts the coarse signal to a binary number. Based on the binary number, a specific number of the delay cells 402 are turned on or activated. Referring to FIG. 5, when a delay cell 500 is active, the switch SW51 is open and when a delay cell 500 is inactive, the switch SW51 is closed, which enables the trigger signal to bypass the delay cell 500. The control signal sets the amount of delay in the delay element 520. When the delay cell 500 is active, the signal from the previous delay cell to the subsequent delay cell is delayed by the delay element 520. When the delay cell 500 is inactive, the signal from a previous delay cell to a subsequent delay cell is not delayed by the delay element 520 because it is bypassed by the switch SW51. The number of active delay cells 402 and the control signal set the delay, which is the pulse width of the PWM signal. It follows that the number of delay devices 402 that are active is a coarse setting for the pulse width; and the control signal is a fine tuning signal in that it tunes pulse widths so that the measured output voltage is equal to the programmed output voltage.

Figure 7:
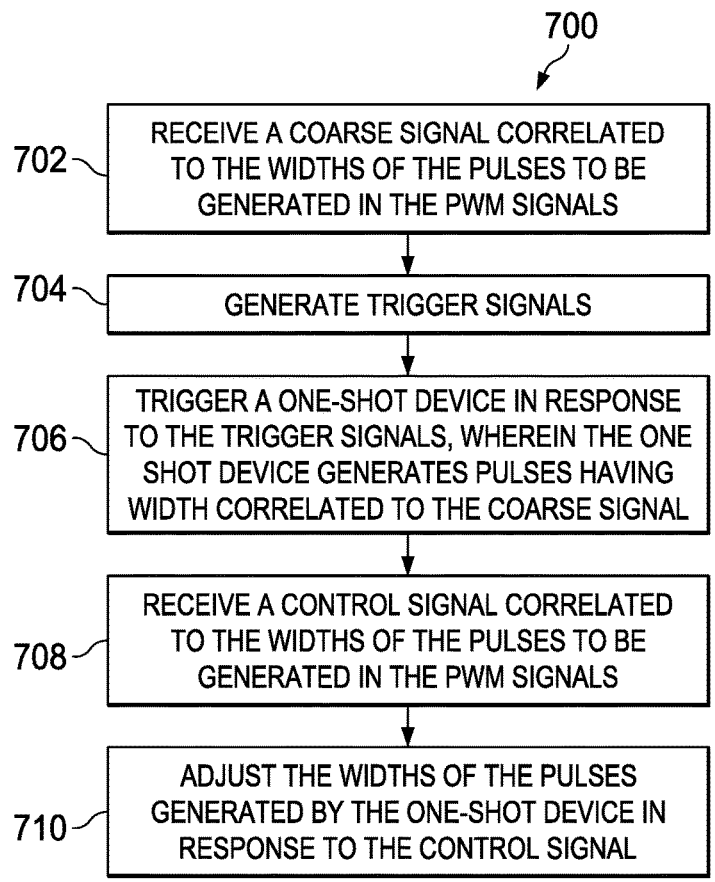
FIG. 7 is a flowchart describing an example of the operation of the PWM generator of FIG. 3.

FIG. 7 is a flowchart 700 describing an example method of generating PWM signals using the circuits of FIGS. 3-6. The flowchart 700 commences at step 702 with receiving a coarse signal correlated to the widths of the pulses to be generated in the PWM signals. Step 704 includes generating trigger signals. Step 706 includes triggering a one-shot device in response to the trigger signals, wherein the one shot device generates pulses having widths correlated to the coarse signal. Step 708 includes receiving a control signal correlated to the widths of the pulses to be generated in the PWM signals. Step 710 includes adjusting the widths of the pulses generated by the one-shot device in response to the control signal.

Figure 8:
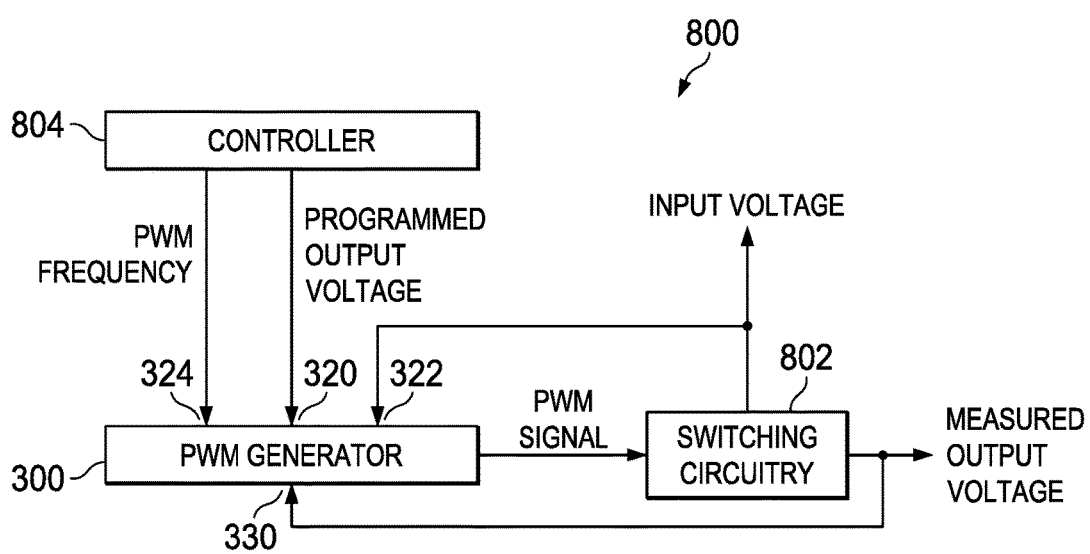
FIG. 8 is a block diagram of a DC-to-DC converter that includes the PWM generator of FIG. 3.

FIG. 8 is a block diagram of a DC-to-DC converter 800 that includes the PWM generator 300 of FIG. 3. The converter 800 includes switching circuitry 802 and a controller 804. The switching circuitry 802 is conventional switching circuitry that is used in DC-to-DC converters and that is controlled by PWM signals. The controller 804 may be a conventional controller used in conventional DC-to-DC converters to set the programmed output voltage of the converter 800 and the frequency of the PWM signals. The controller 804 transmits signals to the PWM generator 300 indicating the programmed output voltage for the converter 800 and the frequency of the PWM signals generated by the converter 300. The converter 300 functions as described above and monitors the measured output voltage and the input voltage. Based on the four inputs, the generator 300 generates the above-described PWM signals to drive the switching circuitry 802. The switching circuitry 802 operates devices that convert the input voltage to the output voltage in response to the PWM signals. The PWM generator 300 is able to operate at higher frequencies than conventional converters, which alleviates the anomalies with conventional converters as described above.

The PWM generator 300 of FIG. 3 has been described above as being used in conjunction with DC-to-DC converters. The PWM generator 300 is able to operate with other devices that require PWM signals, including AC-to-DC converters and AC-to-AC converters.

Although illustrative embodiments have been shown and described by way of example, a wide range of alternative embodiments is possible within the scope of the foregoing disclosure.

What is claimed is:

1. A method comprising:
   receiving a coarse signal correlated to first widths of first pulses to be generated in a pulse width modulated (PWM) signal;
   generating trigger signals;
   decoding the coarse signal to a number of delay cells to be activated;
   triggering a one-shot device in response to the trigger signals, the one shot device generating second pulses having second widths correlated to the coarse signal;
   receiving a control signal correlated to the first widths of the first pulse to be generated in the PWM signal; and
   adjusting the second widths of the second pulses generated by the one-shot device in response to the control signal.

2. The method of claim 1, wherein the generating the trigger signals is performed by a triggering device includes a plurality of delay cells, and wherein the generating the second pulses having the second widths correlated to the coarse signal comprises activating the number of delay cells correlated to the first widths of the first pulses.

3. The method of claim 1, wherein the PWM signal is used in conjunction with a device having a programmed output signal and a measured output signal, and wherein the control signal is proportional to a difference between the measured output signal and the programmed output signal.

4. The method of claim 1, wherein the adjusting the second widths of the second pulses generated by the one-shot device in response to the control signal comprises minimizing an error between the first and second widths indicated by the control signal.

5. The method of claim 1, wherein the PWM signal is used in conjunction with a device having a programmed output signal and an input signal, and further comprising generating the coarse signal, wherein the coarse signal is proportional to a period of the PWM signal multiplied by a ratio of the programmed output signal to the input signal.

6. The method of claim 1, wherein the PWM signal is used in conjunction with a voltage converter having a programmed output voltage and an input voltage, and further comprising generating the coarse signal, wherein the coarse signal is proportional to a period of the PWM signal multiplied by a ratio of the programmed output signal to the input signal.

7. A PWM generator comprising:
   a one-shot device comprising:
   a plurality of delay cells coupled in series;
   a first input for receiving a trigger signal, the first input coupled to a first of the delay cells coupled in series;
   a second input for receiving a coarse signal, the coarse signal for determining which of the plurality of delay cells are active;
   a third input for receiving a control signal, the third input coupled to a variable delay, wherein the control signal is for setting a delay period of the variable delay; and
   an output coupled to a last of the plurality of delay cells, wherein the output is for outputting a PWM signal.

8. The PWM generator of claim 7, wherein at least one of the delay cells is coupled to bypass circuitry for enabling signals to bypass the variable delay.

9. The PWM generator of claim 8, wherein the bypass circuitry includes a switch and wherein the PWM generator further comprises a decoder for decoding the coarse signal to a signal for controlling a state of the switch.

10. The PWM generator of claim 9, wherein the decoder decodes the coarse signal to a plurality of bits, each of the plurality of bits coupled to one of a set of switches, wherein a state a bit controls is a state of the switch to which the bit is coupled.

11. The PWM generator of claim 7, wherein the PWM generator is for controlling a circuit having a programmed output signal and a measured output signal and wherein the PWM generator further comprises feedback circuitry for generating the control signal, wherein the feedback circuitry generates the control signal as a difference between the programmed output signal and a measured output signal.

12. The PWM generator of claim 11, wherein the circuit is switching circuitry in a DC-to-DC converter, the programmed output signal is a DC voltage programmed to be output by the DC-to-DC converter, and the measured output signal is the DC voltage output by the DC-toDC converter.

13. The PWM generator of claim 7, wherein the PWM generator operates in conjunction with a switching device having an input signal, the PWM generator further comprising circuitry for generating the coarse signal, the circuitry for generating the coarse signal comprising:
   an input for receiving a signal proportional to a frequency of the PWM signal;
   an input for receiving the programmed output signal;
   an input for receiving the input signal; and
   circuitry for generating performing operations on the signal proportional to the frequency of the PWM signal, a programmed output signal, and the input signal, a resultant being the coarse signal.

14. The PWM generator of claim 7, wherein the PWM generator is for generating switching signals in a voltage converter and wherein a programmed output signal is a programmed output voltage of the voltage converter and an input signal is an input voltage to the converter.

15. A DC-to-DC converter comprising:
   switching circuitry for receiving an input voltage and generating an output voltage in response to a PWM signal; and
   a PWM generator for generating the PWM signal, the PWM generator comprising:
   a plurality of delay cells coupled in series;
   a first input for receiving a trigger signal, the input coupled to a first of the delay cells coupled in series;
   a second input for receiving a coarse signal, the coarse signal for determining which of the plurality of delay cells is to be active;

a third input for receiving a control signal, the third input coupled to a variable delay, wherein the control signal is for setting a delay period in the variable delay; and an output coupled to the last of the plurality of delay cells, wherein the output is for outputting a PWM signal.

16. The converter of claim 15, further comprising a controller for determining the output voltage of the converter.

17. The converter of claim 15, further comprising a controller for determining a frequency of the PWM signal generated by the PWM generator.

18. The converter of claim 15, further comprising feedback circuitry for determining the difference between the output voltage and a programmed output voltage of the converter, a difference being proportional to the control signal.

19. The converter of claim 15, wherein at least one of the delay cells has bypass circuitry for enabling signals to bypass the variable delay.

\* \* \* \* \*